United States Patent [19]

McSpadden

[11] 4,366,938

[45] Jan. 4, 1983

[54] GRIP FOR CABLE OR THE LIKE

[75] Inventor: John S. McSpadden, Greensboro, N.C.

[73] Assignee: Bell Telephone Laboratories, Incorporated, Murray Hill, N.J.

[21] Appl. No.: 247,506

[22] Filed: Mar. 25, 1981

[51] Int. Cl.³ ............................................. F16L 3/14
[52] U.S. Cl. ........................................ 248/61; 294/74; 174/DIG. 8
[58] Field of Search ................ 248/61, 317, 318, 102; 294/74; 174/DIG. 8; 24/16 R

[56] References Cited

U.S. PATENT DOCUMENTS

| | | | |
|---|---|---|---|
| 870,002 | 11/1907 | Williams | 248/61 |
| 1,559,740 | 11/1925 | Cardarella | 248/102 |
| 1,630,167 | 5/1927 | Cardarella | 248/102 |
| 2,452,485 | 10/1948 | Obernauer | 24/16 R X |
| 2,509,422 | 5/1950 | Clapp | 248/61 |
| 2,744,707 | 5/1956 | Peterson | 248/61 |
| 3,691,505 | 9/1972 | Graves | 174/DIG. 8 X |
| 4,062,510 | 12/1977 | Brochu | 248/102 |

Primary Examiner—William H. Schultz
Assistant Examiner—Ramon O. Ramirez
Attorney, Agent, or Firm—J. P. Kearns

[57] ABSTRACT

A mechanism for providing fixed attachment points along an extended cylindrical object, such as a cable, utilized helically counterwound straps terminated in loops to form a common gripping junction. In order to forestall slippage heat shrinkable tubes are applied over the crisscrossed straps.

4 Claims, 9 Drawing Figures

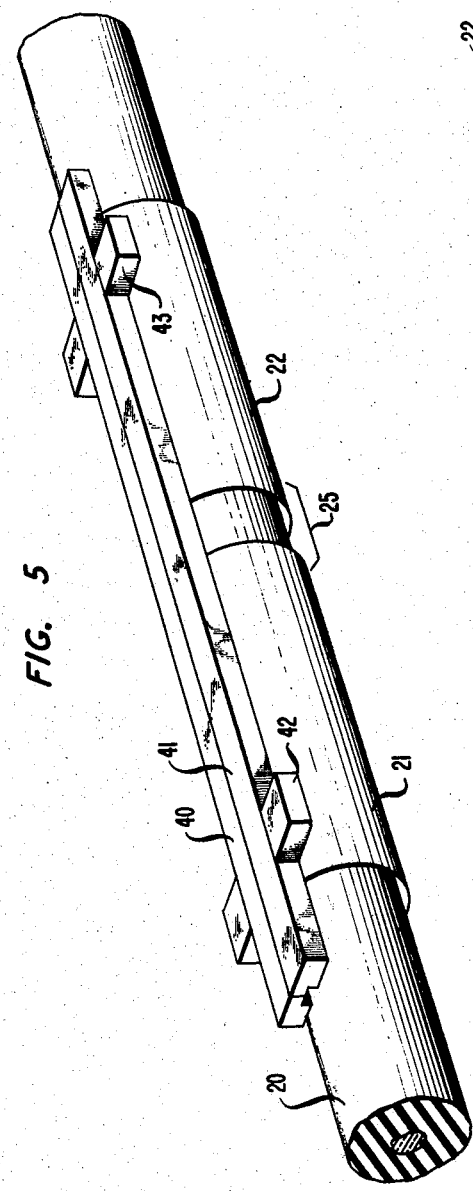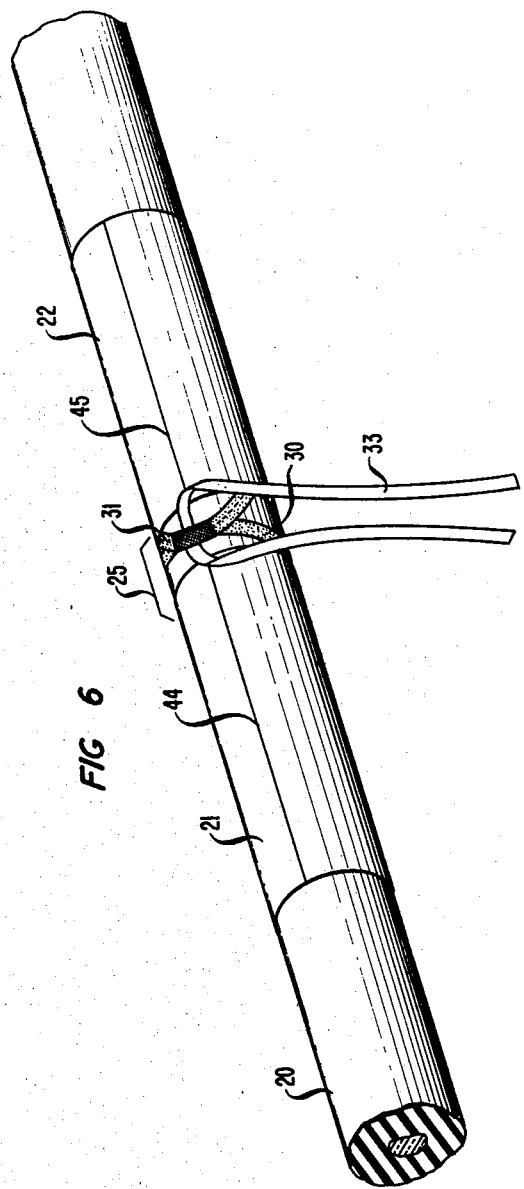

GRIP FOR CABLE OR THE LIKE

FIELD OF THE INVENTION

This invention relates generally to cable handling and, in particular, to the art of stopping and gripping cables and ropes during launching and recovery operations.

BACKGROUND OF THE INVENTION

Many securing devices are known for handling cables, pipes, ropes and other extended-length cylindrical objects, both rigid and flexible. Some can be used only near the ends of such objects because they are tubular in form. Others require clamping around the circumference of such objects. What is often desired is an easily affixed gripper that is strong enough to grip without slipping, yet flexible enough not to damage the surface of the object under stress. Another desirable characteristic is that of a fixed attachment point that can be use for lifting or lowering, as well as pulling in either axial direction, the cylindrical load. With particular reference to the illustrative embodiment disclosed in this specification a corrosion-resistant structure is desired for use in saline marine environments.

It is an object of this invention to provide an economical, readily attachable gripper for extended-length cylindrical objects.

It is a further object to provide a quickly applied, corrosion-resistant gripping attachment for cylindrical objects.

SUMMARY OF THE INVENTION

According to this invention, an omnidirectional messenger junction grip for cylindrical objects, such as ropes and cables, is fabricated from tapes of synthetic material, such as nylon, counterwrapped around the cylindrical object to provide attachment loops and further overlaid with heat-shrinkable tubes to insure against slippage.

Applications of the junction grip include attachment of a relatively delicate cable, such as a fiber optic cable, to a sturdier stress-bearing messenger rope during launching and recovery operations at sea; suspension of a communication cable from its messenger from pole to pole; anchorage of hardware to cylindrical objects; and provision of a fixed loop by means of which rope or cable can be pulled through duct work or lowered into trenches.

BRIEF DESCRIPTION OF THE DRAWING

The objects and applications of the invention will become more apparent from a consideration of the following detailed description and the drawing in which:

FIGS. 2 through 5 illustrate stages in the attachment of the junction grip of this invention to a cable;

FIG. 6 shows the completed attachment of the junction grip of this invention to a cable, including sealed shrink tubes.

DESCRIPTION OF THE ILLUSTRATIVE EMBODIMENT

The omindirectional cable junction grip, or "J-Grip", is a mechanism that provides a fixed attachment point in the form of a loop of strapping material, such as nylon, which can be applied to rope, cable or any cylindrical object. For reliability and security a heat shrinkable tube is applied over at least a pair of fabric straps that are helically wound in opposite directions around the rope or cable.

The loop provided by the J-Grip of this invention is in principle capable of sustaining loads up to 10,000 pounds in any direction in accordance with the size of straps used to form the loop. When the J-Grip is fabricated of synthetic material, it becomes highly corrosion-resistant and can be used in both fresh and salt water and in both frigid and tropical climates.

Figure 1:
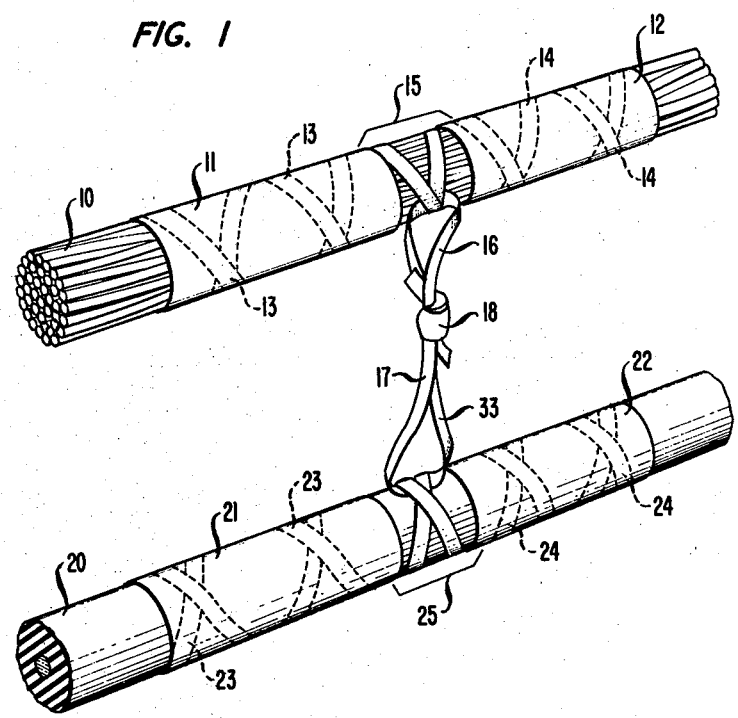
FIG. 1 is a sketch of a messenger rope joined to a cable through a pair of grips according to this invention.

FIG. 1 illustrates an important application of the J-Grip to cable handling. In FIG. 1 messenger rope 10 is married to communications cable 20 by one or more J-Grips of this invention. Cable 20 can be a fiber optics cable of relatively delicate construction, while messenger rope 10 can be of rugged hemp, kevlar or steel construction. Messenger rope 10 and cable 20 can be joined at intervals by a plurality of J-Grips to facilitate the handling and recovery of cable 20 from shipboard in a marine environment.

Each J-Grip comprises first (13, 23) and second (14, 24) flat fabric straps helically laid about rope 10 and cable 20, and shrinkable tubes (11, 12) on rope 10 and (21, 22) on cable 20. A fabric link strap 33 is looped initially through inner loops of straps 23 and 24 on cable 20. Link strap 33 is also looped through straps 13 and 14 on messenger cable 10 after shrinkable tubes 11 and 12 have been positioned on messenger rope 10 and are finally tied together at ends (16, 17) in a slip-proof knot 18. Respective gaps 15 and 25 are left between shrinkable tubes (11, 12) and (21, 22) as shown so that ends (16, 17) of link strap 33 can be looped together with helical straps (13, 14) and (23, 24) on respective cylindrical shapes 10 and 20.

FIGS. 2 through 5 depict stages in arranging helical straps 30, 31 and link strap 33 about either cylindrical shape. In a typical cable and messenger marriage intended for a marine environment diameters on the order of one to two inches are encountered. The communications cable is generally sheathed with polyethylene and the messenger is rope of synthetic material, such as kevlar. The straps are cut from synthetic webbing, such as nylon, about 9/16-inch across.

Figure 2:
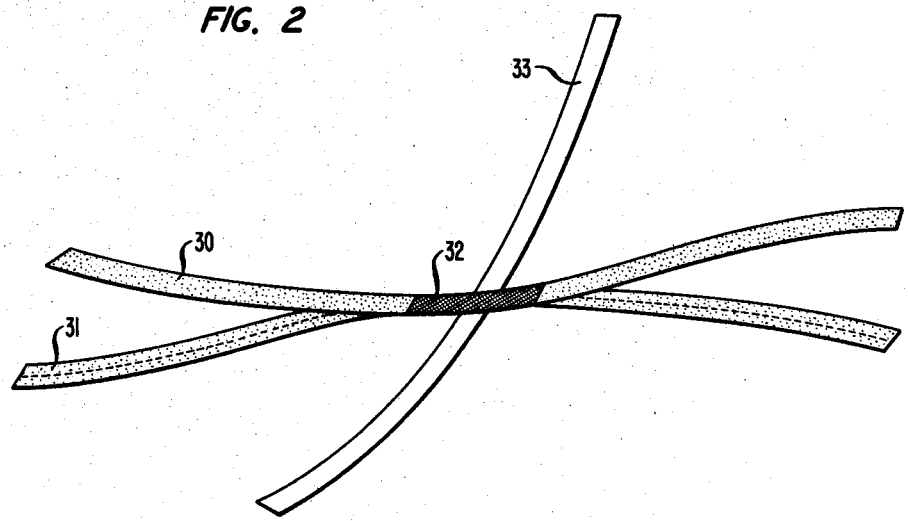

As shown in FIG. 2 two grip pieces 30 and 31 of nylon webbing cut to approximate 24-inch lengths are laid flat atop one another, joined at their midpoints to facilitate further handling and temporarily secured with one-inch vinyl mastic tape 32. The link-up tape 33 of the same nylon strapping cut to a length of about 28 inches is placed atop the midpoint of straps 30 and 31 and temporarily secured with more mastic tape (not shown) in a perpendicular relationship to the grip tapes 30 and 31.

Figure 3:
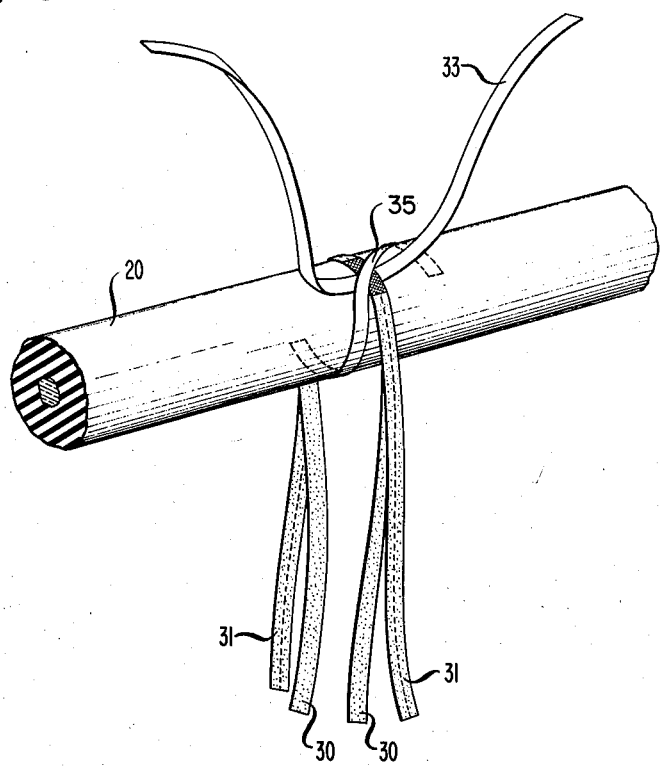

FIG. 3 shows grip tapes 30 and 31 and link tape 33 laid over cable 20 to be supported. A futher strip of one-inch vinyl mastic tape 35 is placed over the midpoints of tapes 30, 31 and 33 to position them on cable 20.

Figure 4:
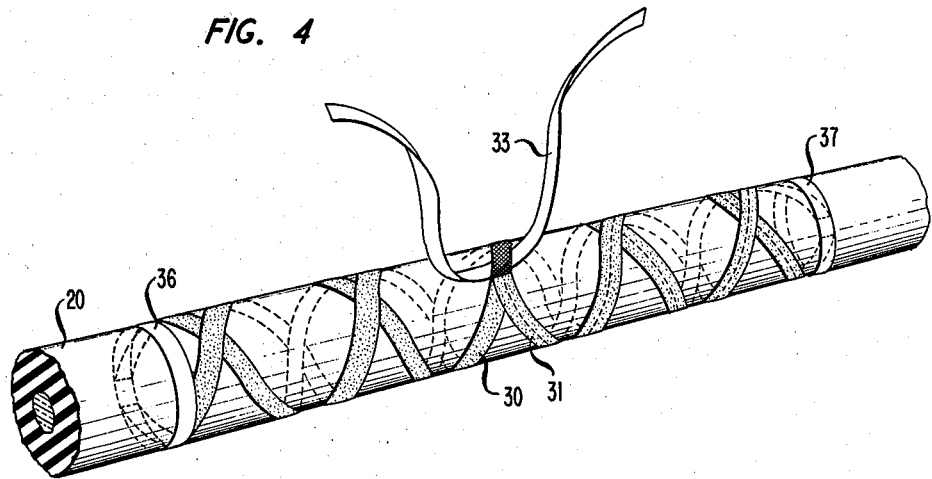

FIG. 4 shows grip straps 30 and 31 spiralled around cable 20 outwardly from the midpoint position. Link strap 33 is allowed to hang free. Half of each grip strap 30 ad 31 is wrapped in the same continuous helix along cable 20 away from the midpoint. One half of each half is wound in a clockwise lay, while the other half is wound in a counterclockwise lay, of approximately one and a half turns over a distance of about four to five inches. The far ends are taped to cable 20 with vinyl mastic types 36 and 37. The helical overlay helps to avoid slippage. In order to hold link strap 33 out of the way while final operations are performed, it is preferable to wrap it perpendicularly around cable 20 at the midpoint and bind it with removable masking tape, for example, of about one-inch width.

FIG. 5 shows a pair of shrinkable tubes 21 and 22 in position around cable 20. Shrinkable tubes of thermosetting plastic are available from Raychem Corporation of 300 Constitution Drive, Menlo Park, Calif. 94205 as type SDC-4 sleeves. Raychem also markets ovens, cooling stations and work stations. In order to apply shrinkable tubes 11 and 12 to messenger rope 10 and tubes 21 and 22 to cable 20 the cylindrical members are conveniently placed on a work station holding jig. The first operation is to cut the sleeve material into lengths about six inches long and position them over the helix straps as indicated in FIG. 5 at locations 21 and 22 on cable 20. The next is to slide seam making channels 40 and 41 over rails formed in the meeting edges of tubes 21 and 22 and tighten clamps 42 and 43 to draw the tube edges together. A gap 25 of about one-half inch is left between tubes 21 and 22 axially of the cable to allow space for access to the loops in straps 23 and 24. The final operation is to place the oven around the tubes and apply the proper temperature for the appropriate time, as recommended by the manufacturers of the oven, a representative sample of which is Raychem Model CV55005SDC. Tubes 21 and 22 will shrink tightly over spiralled tapes 23 and 24 and the abutting edges held by channels 40 and 41 will fuse. Remove channels 40 and 41 by releasing clamps 42 and 43 and trim the excess material, thereby forming a bead along the seam.

FIG. 6 shows the completed J-Grip on cable 20 including shrinkable tubes 21 and 22 separated by gap 25 and joined at seams 44 and 45. Link strap 33 is further shown hanging free from the double loop formed by helical straps 30 and 31, which are clamped to cable 20 by shrinkable tubes or sleeves 21 and 22.

Similarly, shrinkable tubes 11 and 12 are fitted on messenger rope 10, as indicated in FIG. 1, over straps 13 and 24. It is advantageous when shrinking tubes 11 and 12 over rope 10 to place a spacer such as a nut under the crossed loops of straps 13 and 14 so that a gap will remain through which one of the free ends of link strap 33 can be fed when cable 20 and rope 10 are to be joined.

Figure 7:
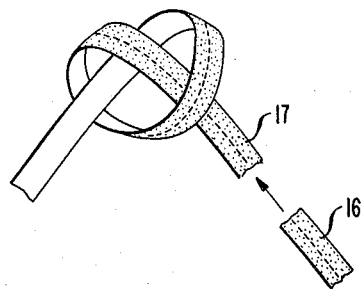
FIGS. 7, 8 and 9 illustrate the joining of ends of link straps from a cable and its supporting messenger rope in a fisherman's knot.
Figure 8:
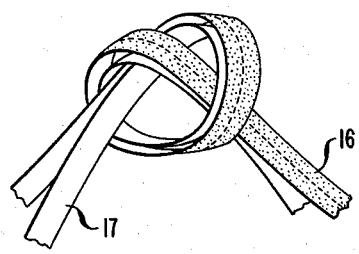
Figure 9:
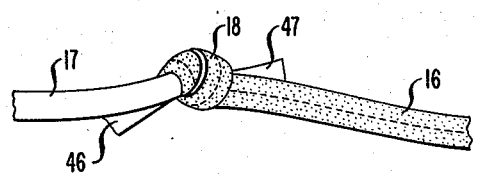

FIGS. 7, 8 and 9 show how a secure fisherman's knot is used to join the free ends (16, 17) of link strap 33, after it has been looped through straps 13 and 14 on rope 10. As shown in FIG. 7 loose overhand knot is formed in one free end 17 of link strap 33. The other free end 16 is threaded through the overhand knot of FIG. 7 as shown in FIG. 8 so that there now exist two parallel overlapping overhand knots. The doubled free ends 16 and 17 are finally drawn up tight as shwon in FIG. 9 to form a secure knot 18 with about an inch of loose ends 46 and 47 exposed. The lengths of a plurality of link-up lines when pulled taut throughout a rope-cable messenger assembly should be held to within one foot, as uniformly as possible.

While this invention has been disclosed in terms of a specific embodiment, it will be readily apparent to one skilled in the cable laying art that many modifications can be made within the spirit and scope of the appended claims.

What is claimed is:

1. A stopper for cable and the like comprising a pair of straps formed into opens loops, joined at their bights, laid with open ends opposed and adapted to be overlapped in counter helical directions away from said bights about the surface of a generally cylindrical body; and a pair of shrinkable tubes fitted over said spread-out loops and separated by a gap at the junction of said bights to provide a nonslip attachment point on such cylindrical body.

2. A stopper for cable as set forth in claim 1, further comprising
 a link-up strap fed through the bights on said pair of straps and drawn up substantially to its midpoint in said bights.

3. A stopper for cable as set forth in claim 1 in which said shrinkable tubes are shrunk to conform to the surface of a cylindrical body by the application of a controlled amount of heat.

4. A messenger and supported cable combination comprising on each of said messenger and cable bodies a plurality of pairs of straps formed into open loops, joined at their bights, laid with open ends opposed and overlapped in counterhelical directions away from said bights about the surface thereof; a pair of shrinkable sleeves fitted over said spread-out loops separated by a gap at the junctions of said bights; and
 a plurality of link-up straps threaded through pairs of bights on each of said messenger and supported cable and securely tied at their free ends to marry said messenger to said cable.

* * * * *

UNITED STATES PATENT AND TRADEMARK OFFICE
CERTIFICATE OF CORRECTION

PATENT NO. : 4,366,938
DATED : January 4, 1983
INVENTOR(S) : John S. McSpadden

It is certified that error appears in the above—identified patent and that said Letters Patent is hereby corrected as shown below:

Column 1, line 2, after the title and before the heading "FIELD OF THE INVENTION" insert --The Government has rights in this invention pursuant to Contract No. N00039-78-C-0006 awarded by the Department of the Navy.--

Signed and Sealed this

Eighteenth Day of December 1984

[SEAL]

Attest:

GERALD J. MOSSINGHOFF

Attesting Officer

Commissioner of Patents and Trademarks